United States Patent Office 2,916,516
Patented Dec. 8, 1959

2,916,516

EVAPORATION OF AQUEOUS UREA SOLUTIONS

Walter Michelitsch, Ludwigshafen (Rhine) Oppau, Germany, assignor to Badische Anilin- & Soda-Fabrik Aktiengesellschaft, Ludwigshafen (Rhine), Germany No Drawing. Application January 30, 1957
Serial No. 637,067

Claims priority, application Germany March 9, 1956

2 Claims. (Cl. 260—555)

This invention relates to a process for evaporating aqueous urea solutions without appreciable biuret formation.

It is known that aqueous urea solutions, such as are obtained by the synthesis of urea from carbon dioxide and ammonia, contain a few tenths percent of biuret and that during evaporation of the urea solutions, further amounts of biuret are formed. Since this content of biuret is injurious and therefore undesirable for certain purposes, as for example for use as a foliar spray, it is important to suppress the formation of biuret as far as possible during the production of the urea.

According to a prior proposal which has not been used industrially, urea poor in biuret can be obtained from urea containing biuret by treating the urea containing biuret, as a melt or as an aqueous solution, with ammonia under increased pressure and at elevated temperatures.

I have now found that aqueous solutions of urea can be evaporated without appreciable biuret formation to a urea content of 95 to 99% in conventional vacuum evaporators, for example in discontinuously operating evaporators having natural circulation, by treating the urea solution during the evaporation with ammonia gas or gases containing ammonia under reduced pressure. It is preferable to lead the ammonia or the gas containing ammonia into the urea solution during the evaporation in an amount of about 5 to 10% of the weight of the urea solution. It is advantageous to treat the urea solution with ammonia gas or gas containing ammonia under reduced pressure or at atmospheric pressure even after the end of the evaporation and until the further working up. The fact that in this way the formation of biuret during the evaporation of urea solutions can be brought practically to a standstill, is surprising, because the solubility of ammonia in urea solution at the low pressures and temperatures of about 100° to 120° C. concerned, is only very small.

The following examples will further illustrate this invention but the invention is not restricted to these examples. The parts specified in the examples are parts by weight.

*Example 1*

1000 parts of an 80% aqueous urea solution having a biuret content of 0.25%, with reference to urea, are evaporated under a pressure of 460 torr and while leadsimultaneous introduction of 100 parts of gaseous ammonia during 15 minutes. The temperature of the urea solution is gradually raised from 80° to 120° C. During the evaporation of the urea solution, only 0.02% of biuret is formed so that the biuret content of the evaporated 97% urea solution is only 0.27%. The urea solution thus obtained is then treated with gaseous ammonia for half an hour at 119° C. until its further working up, the formation of biuret which would otherwise proceed, is similarly retarded and the increase in the biuret content after the end of the evaporation amounts only to 0.07%.

*Example 2*

1000 parts of an 80% aqueous solution of urea with a biuret content of 0.28%, with reference to urea, are evaporated under a pressure of 460 Torr and while leading in a mixture of 80 parts of ammonia and 40 parts of carbon dioxide in 15 minutes. The temperature of the urea solution is gradually raised from 80° to 120° during the said time. During the evaporation of the urea solution, only 0.04% of biuret is formed so that the biuret content of the evaporated 97% urea solution amounts to only 0.32%. The urea solution thus obtained is then treated with a gas mixture of the said composition for half an hour until it is further worked up, the increase in the biuret content after completion of the evaporation remaining limited to 0.07%.

*Example 3*

1000 parts of an 80% urea solution having a biuret content of 0.28%, with reference to urea, when evaporated for 15 minutes under the favorable pressure of only 180 torr without the use of ammonia, however, the temperature of the urea solution being gradually raised from 80° to 120° C. as in the foregoing examples, form during the evaporation process 0.27% of biuret. The biuret content of the finally evaporated 97% urea solution thus amounts to 0.55%. If the urea solution thus obtained is then stored for half an hour at 119° C. at atmospheric pressure, the biuret content rises further to 0.88%.

I claim:

1. The process of evaporating water from an aqueous urea solution containing at least about 80% of urea by weight of the solution without appreciable biuret formation which comprises at the same time: maintaining said solution under subatmospheric pressure, heating said solution at a temperature in the range of 80° C. to 120° C., and introducing ammonia gas into said solution, the quantity of ammonia gas introduced being about 5% to 10% by weight of said solution; and evaporating water from said solution under the said conditions to a urea content of about 95% to 97% by weight of the solution.

2. The process for evaporating water from an aqueous urea solution containing at least about 80% of urea by weight of the solution and a fractional percent of biuret by weight of the urea without appreciable biuret formation which comprises at the same time: maintaining said solution under subatmospheric pressure, heating said solution at a temperature in the range of 80° C. to 120° C., and introducing ammonia gas into said solution, the quantity of ammonia gas introduced being about 5% to 10% by weight of said solution; and evaporating water from said solution under the said conditions to a urea content of about 95% to 97% by weight of the solution, the maximum increase in biuret content being about 0.04% by weight of the urea.

References Cited in the file of this patent

UNITED STATES PATENTS

| | | |
|---|---|---|
| 2,307,253 | Yee et al. | Jan. 5, 1943 |
| 2,527,315 | Mackay | Oct. 24, 1950 |
| 2,632,771 | White | Mar. 24, 1953 |
| 2,744,133 | Cramer | May 1, 1956 |

FOREIGN PATENTS

| | | |
|---|---|---|
| 586,025 | France | Dec. 20, 1924 |
| 125,219 | Switzerland | Apr. 2, 1928 |

UNITED STATES PATENT OFFICE

CERTIFICATE OF CORRECTION

Patent No. 2,916,516                          December 8, 1959

Walter Michelitsch

It is hereby certified that error appears in the printed specification of the above numbered patent requiring correction and that the said Letters Patent should read as corrected below.

Column 1, line 61, for "while lead-" read -- with the --.

Signed and sealed this 7th day of June 1960.

(SEAL)
Attest:

KARL H. AXLINE
Attesting Officer

ROBERT C. WATSON
Commissioner of Patents